Dec. 5, 1950
W. W. BEMAN
2,532,753
TRANSONIC AIRFOIL DESIGN
Filed July 5, 1947
2 Sheets-Sheet 1
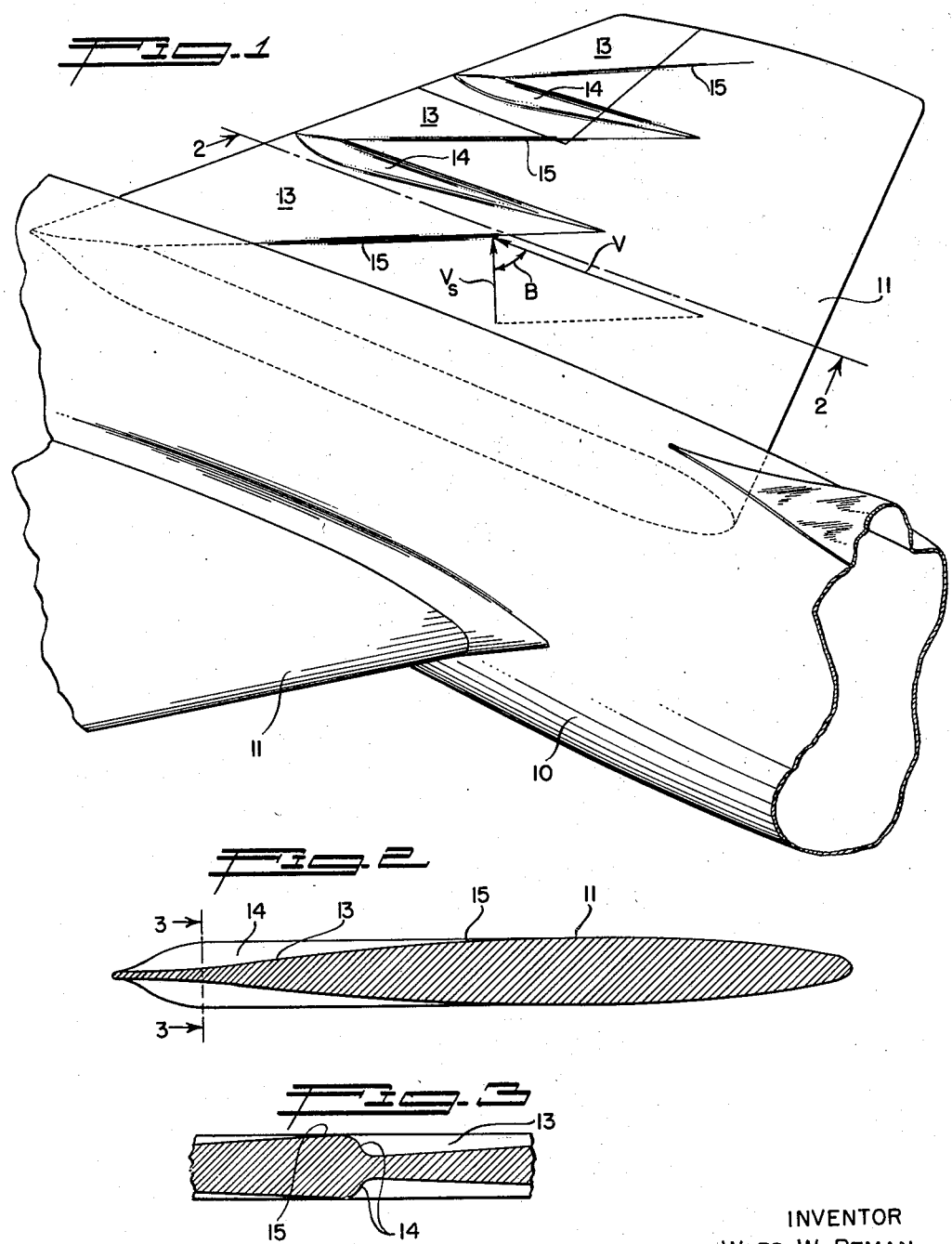
INVENTOR
WARD W. BEMAN
By
*George Sullivan*
Agent

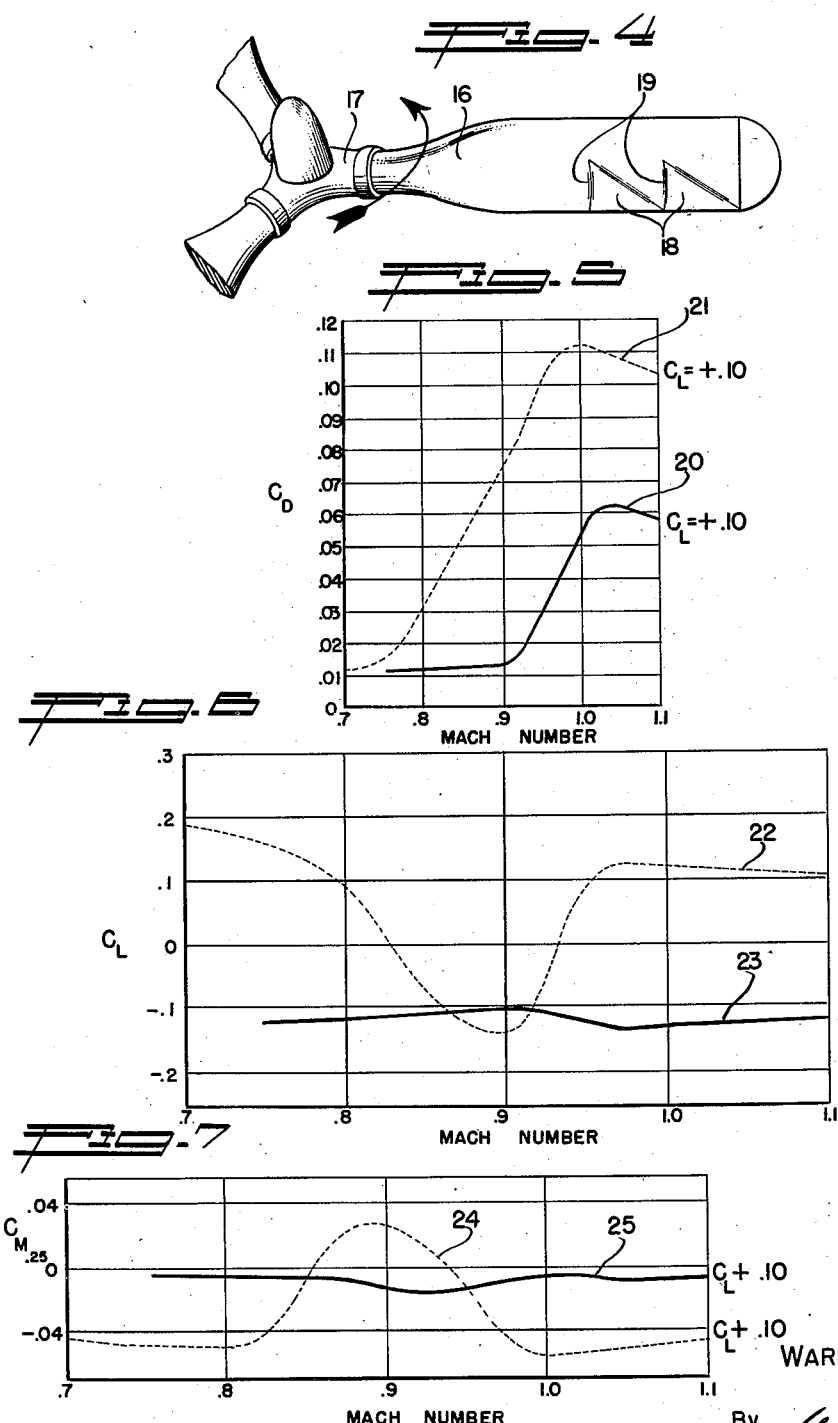

Patented Dec. 5, 1950

2,532,753

UNITED STATES PATENT OFFICE 2,532,753

TRANSONIC AIRFOIL DESIGN

Ward W. Beman, Glendale, Calif., assignor to Lockheed Aircraft Corporation, Burbank, Calif.

Application July 5, 1947, Serial No. 759,020

4 Claims. (Cl. 244—40)

This invention relates to an improved airfoil design involving an interrupted surface configuration for controlling, suppressing and/or delaying the formation of a shock wave as the air flow over the airfoil surface approaches the speed of sound.

It is well known that with conventional airfoils a standing compressibility shock wave forms over the surface of a wing or other airfoils such as propeller and rotor blades and that such shock waves normally develop at subsonic speeds influenced by local accelerations of air flow incident to the operation of such airfoils. It is also known that highly swept-back wings delay the development of such shock waves but that such swept-back wings and other airfoils have serious structural limitations and disadvantages and are inefficient and undesirable at the lower air speeds necessary in take-off and landing.

It has been generally recognized that the speed of sound is the controlling factor in the formation of shock waves and that the transonic range of air speeds, called the Mach number, varies with elevation and atmospheric conditions, so that the Mach number is used for reference and comparative purposes in preference to the true air speed.

It is an object of this invention to provide a wing or other airfoil wherein the formation of the shock wave is controlled and located at a predetermined wave crest line angularly disposed relative to the airplane wing or airfoil line of movement; the crest of the shock wave being formed parallel to one or more staggered lines of maximum velocity determined by lines of maximum thickness built into the airfoil. If more than one angular discontinuity is required an abrupt discontinuity parallel to the line of motion of the airfoil is provided, which gives a saw-tooth appearance to the trailing surfaces of the airfoil.

Since a shock wave can only exist if the local velocity through the shock wave in a direction perpendicular to the shock wave is equal to the speed of sound (Mach number 1.0), the actual air speed in the direction of motion will necessarily be greater than Mach number 1.0 in order that the component of this velocity perpendicular to the angularly disposed shock wave crest is equal to the speed of sound (Mach 1.0).

Basically, a shock wave exists parallel to a line of $V_{max}$. Therefore, an object of this invention is to artificially locate the line of $V_{max}$ so that a shock wave can not exist until the true speed V is greater by the amount $$V = \frac{V_s}{\cos B}$$

My invention is applicable to both fixed airfoils such as wings and control surfaces for airplanes, and rotating airfoils such as conventional propellers and rotors for helicopters and the like. In the case of rotating airfoils the tip speed, rather than the rotational speed, forms the limiting factor which can be raised by the application of the principles of my invention.

Other objects and features of the invention will be readily understood from the following detailed description of typical preferred forms of the invention wherein reference will be made to the accompanying drawings in which:

In the accompanying drawings I have shown the application of the principles of this invention to an airplane wing in Figure 1; Figures 2 and 3 representing a chord and a fragmentary section parallel to the axis of the wing, respectively taken on the line 2—2 of Figure 1 and the line 3—3 of Figure 2.

Figure 4 shows the application of this invention to one blade of an otherwise conventional propeller.

Figures 5, 6 and 7 respectively compare the performances of a wing embodying my invention with that of a standard wing of the same master profile; the characteristics of a wing of my invention being shown by the solid lines and the standard wing by dotted lines. Figures 5 compares the drag coefficient up to a Mach number of 1.1; Figure 6 compares the lift coefficient; and Figure 7 the moment coefficients. These curves were derived from wind tunnel tests at air speeds corresponding to the Mach numbers indicated.

As shown on the drawings, a conventional fuselage 10 has wings 11 of generally rectangular or tapered planiform. The basic high speed wing section is shown by the outline of Figure 2, the cross-hatched portion of which indicates diagonally faired depressions 13 in both the top and bottom of the wing surface. The top and bottom depressions may be either staggered or aligned with each other. One or more of these tapered depressions may be formed along the length of the wing and if two or more are used they are abruptly merged by an intermediate ridge 14 disposed in the line of flight. The use of several of the faired depressions 13 and intermediate ridges 14 contributes to a saw-tooth appearance, although the trailing edge of the wing is unbroken.

The arrangement of the crest 15, or start of the depressions 13 relative to the center line of the wing span is so chosen as to be the line of maximum velocity, which is a diagonal line along which a shock wave must form as the airplane speed approaches the subsonic and transonic speeds. It will be understood that the line of maximum velocity involves local accelerations normally producing compressibility shock waves at airplane speeds below the transonic range. The staggered angular relationship of the depressed areas 13 makes it necessary, if a shock wave is to exist, for such a shock wave to form along the staggered crests 15 of the depressions 13 at an angle to the flight path determined thereby.

As indicated by the triangular diagram superimposed on Figure 1, the angle B of the shock wave crest 15 relative to the flight line determines the airplane speed V required to produce a shock wave velocity equal to the speed of sound $V_s$ normal to the crest of the shock wave. This speed V must be greater than $V_s$ since the mathematical relationship is $$V = \frac{V_s}{\cos B}$$

The crest 15 may be swept forwardly as shown in the drawings, or reversed relative to the wing or propeller centerline to produce a swept-back appearance. The former arrangement seems preferable for structural reasons. While I prefer that the maximum forward position of the apex of the ridge 14 and crest 15 of each depression will extend to the maximum thickness point of the wing, it may be carried to the leading edge if so desired.

The same arrangement can be applied to propellers and other rotating airfoils as indicated in Figure 4 wherein one blade 16 and the hub 17 of a conventional propeller are shown, the blade being formed with one or more diagonally faired depressed areas 18 with intervening ridges 19. In the case of such rotating airfoils the tip speed becomes the critical factor and can be correspondingly increased by controlling the angular disposition of the shock wave as previously described in connection with the wing of Figure 1.

The airfoil of this invention has been compared with a standard airfoil of the same basic contour in wind tunnel tests embodying Mach numbers up to 1.1, ten per cent above the speed of sound.

Figure 5 compares the drag of the novel airfoil, solid line 20, with that of the standard airfoil, dotted line 21. It will be noted that the drag of the standard section starts to rise at a Mach number of about .75 whereas with the saw-tooth section, this does not occur until a Mach number of .91 has been reached. Furthermore, the maximum drag of the saw-tooth wing is approximately half that of the standard wing.

A very important characteristic of the saw-tooth section is exemplified in Figure 6 which illustrates the change in lift coefficient versus Mach number. The solid line 22 represents the result obtained by utilizing my invention, as compared to the dotted line 23 having the same basic airfoil section. It is apparent that the lift (or in the case of a propeller, the thrust) begins to reduce seriously with a Mach number of about .75, whereas the saw-tooth wing exhibits an increase of lift on up to a Mach number of .9 but is substantially constant on up to a Mach number of 1.1.

Figure 7 shows the comparative moment coefficients of the two wings. The dotted line 24 shows that the standard wing starts to become unstable at a Mach number of .8, which, in the case of a propeller, would lead to severe tip vibration. Furthermore, the standard wing exhibits a rather tremendous change in moment which is severe structurally, in the case of an airplane promoting high torsion in the wing and very high tail loads, as well as inducing destructive vibration in the wing and control surface, and in the case of the propeller putting very high loads on the blade pitch mechanism. On the other hand, the moment loads on the saw-tooth wing, solid line 25, are negligibly small and remain consistent and uniform without exhibiting instability throughout the range of speeds up to a Mach number of 1.1.

The characteristics shown here for the saw tooth wing are unique for any kind of wing section that has been published to date, other, perhaps, than a planiform incorporating a high angle of sweep, which is very unattractive from a structural standpoint, particularly in the case of propellers. The tests would indicate, therefore, that this type of wing section has advantages which would be particularly attractive for use on a propeller in that it would permit the use of a smaller diameter propeller for the same thrust by running to higher tip speeds, a consideration which is very important in the overall design of a propeller-driven aircraft. This factor will become increasingly important with high-power turbo-driven propellers.

It will thus be seen that I have invented an improved wing section that permits control and/or delay of the formation of sonic or compressibility shock waves and destructive vibrations incident thereto, thus permitting an increased airplane speed and increased propeller tip speed before such shock waves develop.

Having thus described my invention and the present preferred embodiments thereof, I desire to emphasize the fact that many modifications may be resorted to in a manner limited only by a just interpretation of the following claims.

I claim:

1. A high speed airfoil having a dominant basic section, and one or more depressions in the surfaces of the airfoil within the profile of said basic section, said depressions being generally triangular in shape and having one side, parallel to the line of airflow over the airfoil, forming a relatively abrupt ridge, another side being formed by the trailing edge of the airfoil and the third side gradually merging into the basic airfoil section in a line diagonally disposed relative to the line of airflow over said airfoil, said diagonally disposed line being so disposed as to predetermine the crest of the compressibility shock wave formed at transonic airflow speeds.

2. A transonic speed airfoil having an airfoil contour with a surface defined in part by a dominant basic airfoil section and having a straight trailing edge and generally triangular depressions in the surface adjacent the trailing edge of said airfoil within the boundary defined by said basic airfoil section of said airfoil contour, said triangular depressions having one side forming a relatively abrupt ridge parallel to the line of airflow over the airfoil and another side forming a relatively gradual merging with the surface of the airfoil contour at a substantial angle to the line of airflow, whereby to predetermine the crest of the anticipated compressibility shock wave.

3. A transonic speed airfoil having a dominant basic airfoil section and generally triangular depressions in the trailing edge surfaces of said airfoil within the boundary defined by said basic airfoil section, said triangular depressions having one side forming a relatively abrupt ridge parallel to the line of airflow over the airfoil and another side forming a relatively gradual merging with the basic airfoil section at an angle to the line of airflow parallel to the crest of the anticipated compressibility shock wave, said triangular depressions being located in the trailing edge portion of the airfoil and having the third side thereof defined by the trailing edge of the airfoil.

4. A transonic speed airfoil for wings, propellers and the like having a dominant basic airfoil section and generally triangular depressions in the rearward surfaces of said airfoil within the boundary defined by said basic airfoil section, said triangular depressions have one side forming a relatively abrupt ridge parallel to the line of airfow over the airfoil and another side forming a relatively gradual merging with the basic airfoil section at an angle to the line of airflow parallel to the crest of the anticipated compressibility shock wave and extending forwardly to a junction with said ridge at the point of maximum thickness of said basic airfoil section.

WARD W. BEMAN.

REFERENCES CITED

The following references are of record in the file of this patent:

UNITED STATES PATENTS

| Number | Name | Date |
|---|---|---|
| 1,773,281 | Scott | Aug. 19, 1930 |
| 2,074,201 | Bechereau | Mar. 16, 1937 |
| 2,210,642 | Thompson | Aug. 6, 1940 |

OTHER REFERENCES

"Flight" for Nov. 4, 1937; pages 450–452.